United States Patent [19]

Plegat

[11] 3,857,595

[45] Dec. 31, 1974

[54] SHOCK-ABSORBER FOR VEHICLES AND THE LIKE

[75] Inventor: Alain Edouard Plegat, Asnieres, France

[73] Assignee: Societe Anonyme Des Usines Chausson, Asnieres, France

[22] Filed: Aug. 27, 1973

[21] Appl. No.: 392,066

[30] Foreign Application Priority Data
Oct. 27, 1973  France .............................. 72.38253

[52] U.S. Cl. ................... 293/71 R, 293/86, 293/88
[51] Int. Cl. ........................ B60r 19/02, B61f 19/04
[58] Field of Search ............ 293/70, 71 R, 71 P, 84, 293/85, 87, 98, 99

[56] References Cited
UNITED STATES PATENTS

| | | | |
|---|---|---|---|
| 1,439,209 | 12/1922 | Watson ................................. | 293/86 |
| 1,807,132 | 5/1931 | Pappas et al. ........................ | 293/86 |
| 2,144,357 | 1/1939 | Booharin ......................... | 293/88 X |
| 3,671,068 | 6/1972 | Gerhard ............................ | 293/70 X |
| 3,717,224 | 2/1973 | Leach et al. ....................... | 293/88 X |

Primary Examiner—Robert S. Ward, Jr.
Attorney, Agent, or Firm—Browdy and Neimark

[57] ABSTRACT

The bumper is placed on a push-rod supported by a piston applied against a pile of pre-stamped washers retained against a stop; in case of a shock the washers are distorted and thus absorb the energy due to the shock.

20 Claims, 6 Drawing Figures

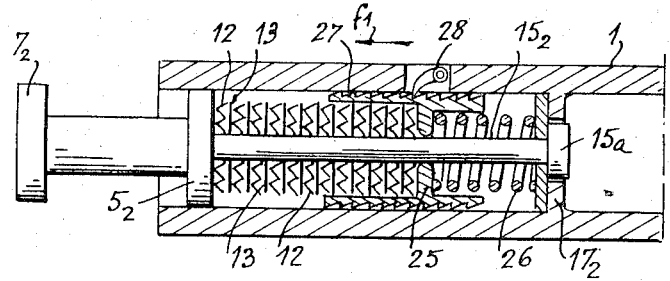
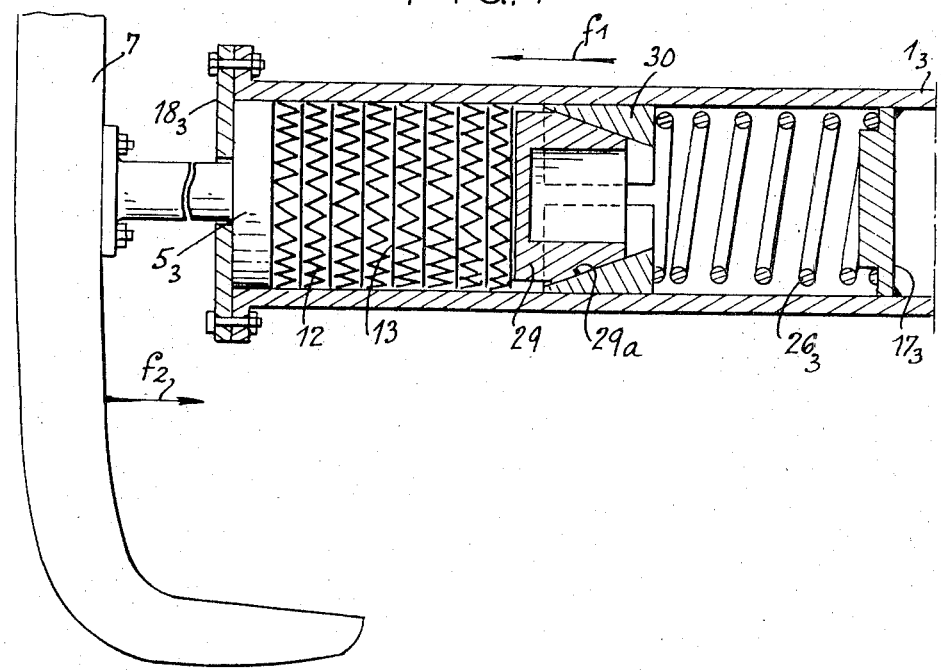
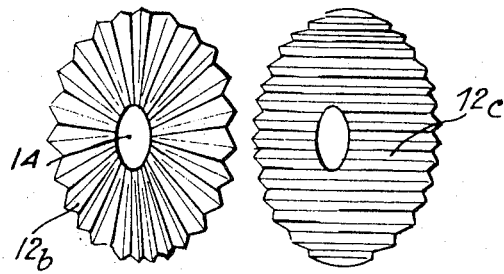
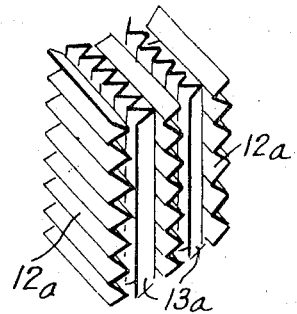

SHOCK-ABSORBER FOR VEHICLES AND THE LIKE

The present invention relates to a device for absorbing casual shocks. This invention has a preferred application to the absorbing of shocks supported by motor cars, but is not restricted to this application only. On the contrary, the present invention can be used for other purposes relating to shock absorption.

It is important in order to limit, as much as possible, the accelerations to which the passengers of a vehicle are submitted when a shock occurs, that some parts of the vehicle, especially that in relation with the bumpers, be deformed and it is also very important that the deformations caused by a shock do not cause a rebound. For this reason, care has always to be taken to prevent the mounting of the bumpers with resilient systems.

The present invention creates a device making possible absorption of energy without important deformations of the bumper resulting therefrom and without resulting deformations of the vehicle body, while the decelerations due to the shocks are reduced for the passengers of the vehicle.

According to the invention, in the case of a vehicle, the shock absorber is characterized in that the bumper is connected through a push-rod to at least one piston held applied against a pile of at least partly distortionable elements, especially washers, placed into a housing and applied against a stop provided on the vehicle, whereby a shock applied to said bumper is transmitted to the piston which applies said shock to the pile of elements of which at least some sustain a permanent distortion absorbing the energy of said shock.

Various other characteristics of the invention are moreover shown in the following detailed description.

Embodiments of the invention are shown by way of non restrictive examples in the accompanying drawings, in which:

FIG. 3 is a partial diagrammatic sectional view showing a development of the invention.

FIG. 4 is a sectional elevation view, similar to FIG. 3, and showing a variant of embodiment of the development of the invention illustrated in FIG. 3.

FIGS. 5 and 6 are perspective views showing the constitution of shock-absorbing elements comprised in the shock-absorber of the invention.

Figure 1:
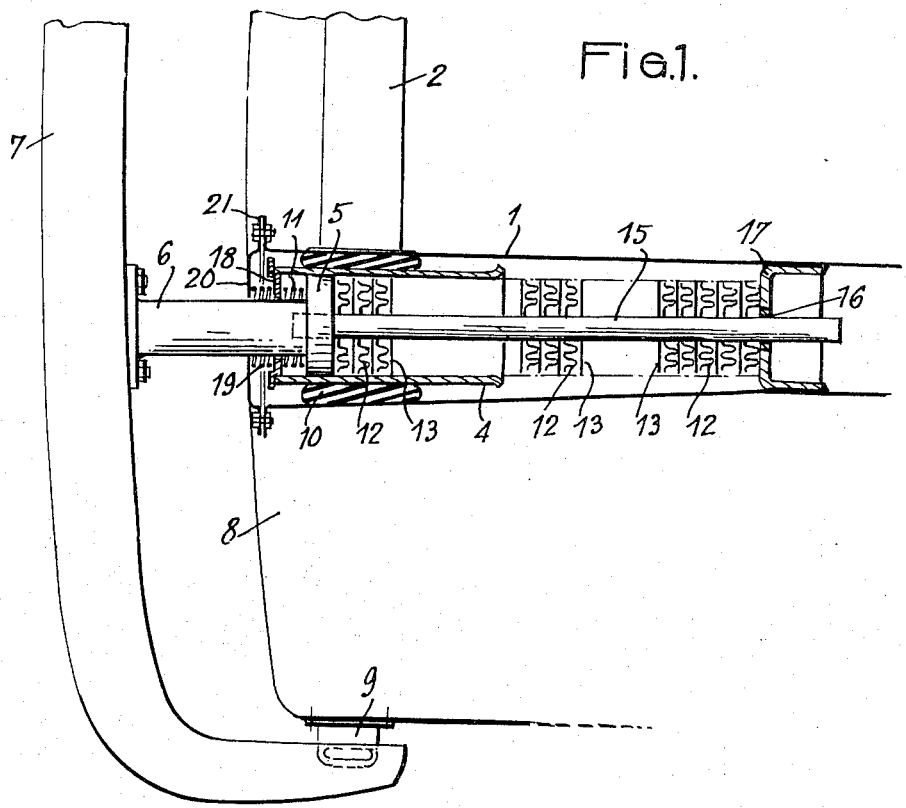
FIG. 1 is a diagrammatic sectional elevation view of the shock-absorber of the invention.

In FIG. 1, 1 designates a beam, for example a beam of a motor-car frame, said beam being of a tubular, circular or rectangular shape. The frame comprises at least two beams which are connected together by one or several crossbars 2.

The beam 1 contains a guiding tube 4 for a piston 5 connected by a push-rod 6 to a bumper 7 which, preferably, is guided on each of the lateral sides of the vehicle designated by 8 by means of a slide 9 designed to prevent any swinging of the bumper, either upwardly or downwardly, but leaving free a possible longitudinal motion.

The guiding tube 4 is inserted inside the beam 1 and connected thereto through a distortionable stuffing 10, for example a rubber ring.

Piston 5 is held applied by a spring 11 against a pile of washers 12, 13 which have been stamped so that corrugations or other protuberances be formed thereon and provide to them an appreciable thickness. The washers 12, 13 are preferably made of sheet metal, though they can also be made of synthetic resin. For example, the washers 12 can be corrugated to be used as a distortioning tool and the washers 13 can be flat to be used as distortionable elements as shown at $12_1$ and $13_1$ respectively in FIG. 2. It is also possible that the washers 12 as well as the washers 13 be corrugated as represented in FIG. 5 where they are designated by $12a$ and $13a$, the corrugations of a given washer being set off or shifted relatively to that of the contiguous washer to prevent the corrugations of two contiguous washers from becoming imbricated.

FIG. 5 shows rectangular elements $12a$ and $13a$ having crossed respective corrugations and FIG. 6 shows washers $12b$ having radial corrugations, and washers $13b$ having parallel corrugations. As shown in FIG. 1, the washers may be provided with a median hole 14 for passing a guiding rod 15 having one end which is engaged with the piston 5 and the other end which is passed in a median hole 16 of a stop 17 fixed in the beam 1.

The spring 11, which maintains the piston 5 applied on the washers 12, 13 in order that they are pressed against each other without any clearance, bears against a cup 18 placed at the end of the guiding tube 4 and applied against said tube by a spring 19 bearing in the bottom of a closing cover 20 of the front part of the beam 1; said cover being, for example, fixed to the beam by bolts 21.

As it appears from the above description, in case of a shock applied to the bumper 7, the energy is transmitted through the piston 5 to the washers 12 on the washers 13 like punches and dies deforming the same, this distortion thus absorbing the energy caused by the shock. Since the distortion sustained by the washers is a permanent distortion, there is no rebound as it would be if said washers were constituted by a resilient assembly.

By carefully selecting the thickness of the washers, the depth of the stampings of which they have been initially provided, as well as their number, it is possible to realize an absorbing unit strictly adapted to the shock energy having to be absorbed and limit the decelerations to a determined threshold and adapt the variation curve of the deceleration with respect to the time to some forms of pre-determined curves.

Since the bumper 7 is laterally guided by the slide 9 and since the guiding tube 4 is supported by the distortable resilient stuffing 10, the washers 13 can support deformations designed to absorb the energy of a shock even when this shock is not applied in a strictly frontal way, because the guiding tube 4 can swing inside the beam 1 and the lateral ends of the bumper can also run in the slide 9.

After a shock cover 20 can be removed and, the washers can be replaced. The device can then be used again.

Figure 2:
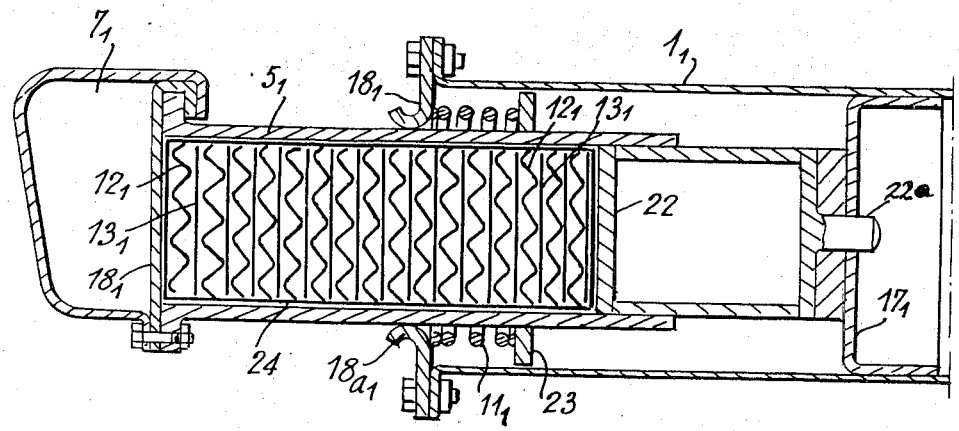
FIG. 2 is a sectional elevation view showing a variant.

FIG. 2 shows a variant according to which the bumper $7_1$ is directly placed on the end of a hollow piston $5_1$ which is guided in a punched cover $18_1$ fixed at the end of the beam $1_1$.

The washers $12_1$, $13_1$ are then placed inside the hollow piston $5_1$ between the bumper and the end of a cylindrical body 22 engaged into the hollow piston and forming anvil, said cylindrical body being itself connected by a lug or swivel joint 22a to the stop $17_1$ placed inside the beam $1_1$.

For the washers $12_1$, $13_1$ to be permanently held pressed against each other, a spring $11_1$ is placed between the cover $18_1$ and a protuberance 23 of the hollow piston $5_1$. In case of a shock occurring against the bumper $7_1$, the piston $5_1$ slides inside the guide formed in the cover $18_1$ and on the hollow body 22 while the washers $12_1$, $13_1$ are distorted. Consequently, the same effect is obtained as described in the disclosure in relation with FIG. 1.

The piston $5_1$ can slide in a non strictly axial way since the guiding action exerted by the cover $18_1$ is realized by means of rounded portions $18a_1$ and since the guiding body 22 cannot fill all the inside of the piston 5 or also the lug or swivel-joint 22a can run in an aperture. Also as in the previous example, after a shock the cover $18_1$ has only to be removed to take out the hollow piston and replace the washers which have been distorted.

Often it is advantageous to group the washers $12_1$, $13_1$ in a cartridge 24, for example made of cardboard, which facilitates placing of the washers in the hollow piston.

It can be advisable that the shock-absorber be used several times without having to replace the washers after each shock. In that case, it is possible to modify the device as illustrated in FIGS. 3, 4.

In FIG. 3, the washers 12, 13 are placed between the piston, then designated by $5_2$, and an auxiliary piston 25 which is pushed against said washers by a spring 26 bearing against the stop $17_2$ of the beam 1. The guiding rod $15_2$ is then provided with a head 15a to limit the release of the spring 26 and consequently to enable the bumper $7_2$ to be in a position well defined with respect to the body of the vehicle. The intermediate piston 25 is provided on its periphery with at least one rack-bar 27, said rack-bar being engaged with at least one catch 28 or any other retaining means.

Upon a first shock, the washers 12, 13 are partially distorted, the intermediate piston 25 not being able to slide since it is retained by the catch or catches 28. After the shock, the spring 26 releases while making the intermediate piston to slide according to arrow $f_1$ up to the moment when the head 15a of the guiding rod $15_2$ comes against a stop, thus bumper $7_2$ is returned back to its initial position. Thus, the replacement of the washers 12, 13 need be made only after several shocks. It is also possible to replace only the distortable washers 13, the shape of the washers 12 and their arrangement providing a positioning of a cartridge full of washers 13.

In FIG. 4, the device is somewhat similar to that of FIG. 2 in that it does not include a guiding rod, the piston $5_3$ coming to a stop against the cover $18_3$ closing the beam $1_3$. The washers 12, 13 are placed between the piston $5_3$ and an auxiliary piston 29 with a tapered end 29a which is engaged in a split ring 30 having a tapered inner wall. The ring 30 is engaged with soft friction inside the beam $1_3$ and against the rear portion of which the spring $26_3$ bears held against the stop $17_3$.

Upon a shock exerted according to arrow $f_2$, the piston $5_3$ transmits the energy of this shock to the washers 12, 13 and, consequently, to the intermediate piston 29 whose tapered wall 29a tends to discard the split ring 30 which is thus pressed inside the beam $1_3$ without sliding in direction of the arrow $f_2$. The washers 13 are, consequently, distorted to absorb the energy of the shock.

When a pressure is no longer applied on the intermediate piston 29, the split ring 30 is no longer pressed against the inner wall of the beam $1_3$, consequently, the spring $26_3$ can release and cause said split ring to slide according to the direction of arrow $f_1$, which causes the motion, also in this direction, of the piston 29 to hold the washers 12, 13 pressed against each other by bringing back the piston $5_3$ into abutment with the cover $18_3$.

The invention is not restricted to the embodiments shown and described in detail, for various modifications thereof can moreover be applied thereto without departing from the scope of the invention as shown in the appended claims.

I claim:

1. A shock-absorber for absorbing shock to a vehicle body comprising:
    a bumper;
    a support for said bumper, said support being slidably mounted with respect to said vehicle body;
    a pile of distortable elements interposed between said support and said vehicle body; and
    resilient means urging said distortable elements one against the other and said slidable member against said vehicle body,
    whereby said distortable elements are always in slight pressure relationship and said slidable support is maintained without any play with respect to the vehicle even though said distortable elements are in part at least distorted during a crush in absorbing the shock energy.

2. Shock absorber as set forth in claim 1, wherein the vehicle body includes hollow longitudinally disposed beams, and said distortable elements are placed inside said longitudinally provided beams of the vehicle body between a stop fixed to each of said beams and said slidable support for the bumper.

3. Shock absorber, as set forth in claim 1, wherein the vehicle is further provided with longitudinal guides for the bumper, the bumper being slidable with respect to said guides.

4. Shock absorber as set forth in claim 1 wherein said distortable elements are provided with corrugations, flanges and other protuberances which absorb the shock energy when a shock is transmitted by said piston connected to said bumper.

5. Shock absorber as set forth in claim 1 wherein said distortable elements are plates placed between stamping punch forming elements to distort said distortable elements when a shock occurs.

6. Shock absorber as set forth in claim 1 wherein said distortable elements are made of thin plates of which some at least are corrugated.

7. Shock-absorber, as set forth in claim 1, wherein the distortable elements are placed in a distortable envelope forming a cartridge.

8. Shock-absorber, as set forth in claim 1, wherein the vehicle is further provided with guides for the bumper, the bumper being slidable with respect to the guides.

9. Shock absorber as set forth in claim 2 further including a guiding tube, and a guiding element, said slidable support for the bumper is placed into said guiding tube and said guiding tube being itself connected inside said beam through said guiding element giving said guiding tube at least one degree of freedom, whereby said bumper may move in an oblique direction with respect to said beam in occurrence of an oblique shock.

10. Shock-absorber, as set forth in claim 9, wherein the guiding element supporting the guiding tube is constituted by a flexible ring.

11. Shock absorber as set forth in claim 2, wherein said slidable support consists of a hollow element guided in a ring shaped part fixed to the end of said beam and having a funnel shaped opening whereby the hollow element may rotate with respect to the axis of the beam.

12. Shock-absorber, as set forth in claim 8 wherein the distortable elements are placed inside the hollow piston in which also penetrates a retaining body forming an anvil which is connected to the stop placed into the beam.

13. A shock absorber for absorbing shock to a vehicle body comprising:
 a bumper;
 a support for said bumper, said support being slidably mounted with respect to said vehicle body;
 a piston slidably mounted parallel to said support;
 a pile of distortable elements interposed between said support and said piston; and
 resilient spring means interposed between said piston and the vehicle body to urge said distortable elements one against the other and said slidable support against said vehicle body,
 whereby said distortable elements are always in slight pressure relationship and said slidable support is maintained without any play with respect to the vehicle even though said distortable elements are in part at least distorted during a crush in absorbing the shock energy.

14. Shock absorber as set forth in claim 13 wherein a beam is connected to the vehicle body to slidably house said slidable support for the bumper, said pile of distortable elements, said piston and said spring means.

15. Shock absorber as set forth in claim 13 further comprising retaining means for said piston, said retaining means being connected to the vehicle body and preventing said piston from moving in the direction of a shock, whereby said retaining means permit said piston to slide only in a direction in which it maintains said distortable elements in close contact with each other while said piston compensates for the distortion of said distortable elements during successive crushes.

16. Shock absorber as set forth in claim 13 wherein said distortable elements are provided with corrugations, flanges and other protuberances which absorb the shock energy when a shock is transmitted by said piston connected to said bumper.

17. Shock absorber as set forth in claim 13 wherein said distortable elements are plates placed between stamping punch forming elements to distort said distortable elements when a shock occurs.

18. Shock absorber as set forth in claim 13 wherein said distortable elements are made of thin plates of which some at least are corrugated.

19. Shock absorber as set forth in claim 15, wherein said retaining means comprise a pawl-and-ratchet mechanism.

20. Shock absorber as set forth in claim 15, wherein said retaining means comprises said piston with a tapered outer wall bearing against a tapered inner wall of a split ring pressed against the inner wall of said hollow beam fixed to the vehicle body.

* * * * *

UNITED STATES PATENT OFFICE
CERTIFICATE OF CORRECTION

Patent No. 3,857,595  Dated December 31, 1974

Inventor(s) Alain Edouard PLEGAT

It is certified that error appears in the above-identified patent and that said Letters Patent are hereby corrected as shown below:

[30] Foreign Application Priority Data
     should read --Oct. 27, 1972--

Signed and sealed this 15th day of April 1975.

(SEAL)
Attest:

RUTH C. MASON
Attesting Officer

C. MARSHALL DANN
Commissioner of Patents
and Trademarks